United States Patent
Ansari et al.

(10) Patent No.: US 9,485,715 B2
(45) Date of Patent: Nov. 1, 2016

(54) SYSTEMS AND METHODS FOR COORDINATING POWER SAVE OPERATIONS IN AN AD HOC NETWORK

(71) Applicant: QUALCOMM Incorporated, San Diego, CA (US)

(72) Inventors: Imran Ansari, Hyderabad (IN); Leela Prasad Kella, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 14/276,674

(22) Filed: May 13, 2014

(65) Prior Publication Data

US 2015/0334648 A1    Nov. 19, 2015

(51) Int. Cl.

| | | |
|---|---|---|
| G08C 17/00 | (2006.01) | |
| H04B 7/00 | (2006.01) | |
| H04W 48/12 | (2009.01) | |
| H04W 52/02 | (2009.01) | |
| H04W 8/24 | (2009.01) | |
| H04W 84/18 | (2009.01) | |
| H04W 84/12 | (2009.01) | |
| H04W 88/08 | (2009.01) | |

(52) U.S. Cl.
CPC ............. *H04W 48/12* (2013.01); *H04W 8/245* (2013.01); *H04W 52/0206* (2013.01); *H04W 52/0216* (2013.01); *H04W 84/12* (2013.01); *H04W 84/18* (2013.01); *H04W 88/08* (2013.01); *Y02B 60/50* (2013.01)

(58) Field of Classification Search
CPC ... H04J 3/0641; H04J 3/0661; H04W 48/12; H04W 84/18
USPC ....................... 370/310, 311; 340/7.32, 7.38; 455/343.1–343.6
See application file for complete search history.

(56) References Cited

U.S. PATENT DOCUMENTS

| | | | |
|---|---|---|---|
| 7,564,826 B2 | 7/2009 | Sherman et al. | |
| 7,817,961 B2 | 10/2010 | Sinivaara et al. | |
| 7,961,659 B2 | 6/2011 | Zaks | |
| 8,477,674 B2 | 7/2013 | Kneckt et al. | |
| 8,942,201 B1 * | 1/2015 | Duvvuri | H04W 28/044 370/314 |
| 2005/0107134 A1 * | 5/2005 | Morioka | H04L 12/12 455/574 |
| 2005/0122927 A1 * | 6/2005 | Wentink | H04B 7/2126 370/311 |
| 2005/0174953 A1 * | 8/2005 | Ho | H04W 48/12 370/310 |
| 2006/0193315 A1 * | 8/2006 | Sinivaara | H04W 48/10 370/389 |
| 2006/0227801 A1 * | 10/2006 | Nanda | H04L 12/5695 370/447 |
| 2006/0251004 A1 * | 11/2006 | Zhong | H04W 52/0216 370/318 |
| 2007/0014269 A1 * | 1/2007 | Sherman | H04W 48/12 370/338 |
| 2007/0238482 A1 * | 10/2007 | Rayzman | H04W 74/04 455/552.1 |

(Continued)

*Primary Examiner* — Khaled Kassim
*Assistant Examiner* — Berhanu Belete
(74) *Attorney, Agent, or Firm* — Paradice and Li LLP

(57) ABSTRACT

Systems and methods are disclosed for facilitating coordination among member stations in an IBSS to allow members to remain in a power save mode of operation for extended periods of time without awakening to transmit or receive beacons at each scheduled TBTT. A power save initiator may establish a power save period during which all nodes in the network may enter a power save mode. Correspondingly, beacons may not be sent during the extended power save period and any traffic to be exchanged between members of the IBSS WLAN may be buffered for delivery after the extended power save period ends.

20 Claims, 5 Drawing Sheets

(56) References Cited

U.S. PATENT DOCUMENTS

| | | | |
|---|---|---|---|
| 2008/0095091 A1* | 4/2008 | Surineni | H04W 52/0225 370/311 |
| 2008/0130530 A1* | 6/2008 | Gabay | H04W 48/08 370/310 |
| 2009/0067373 A1* | 3/2009 | Kneckt | H04W 52/0216 370/328 |
| 2009/0103501 A1* | 4/2009 | Farrag | H04W 74/02 370/337 |
| 2009/0232042 A1* | 9/2009 | Kneckt | H04L 12/12 370/312 |
| 2010/0135256 A1* | 6/2010 | Lee | H04W 16/14 370/336 |
| 2011/0051638 A1* | 3/2011 | Jeon | H04L 12/12 370/311 |
| 2012/0224568 A1* | 9/2012 | Freda | H04W 56/0015 370/338 |
| 2012/0250537 A1* | 10/2012 | Shatil | H04W 52/0216 370/252 |
| 2014/0010223 A1 | 1/2014 | Wang et al. | |
| 2014/0079016 A1* | 3/2014 | Dai | H04L 5/0041 370/330 |
| 2014/0376432 A1* | 12/2014 | Smith | H04W 52/0206 370/311 |

\* cited by examiner

SYSTEMS AND METHODS FOR COORDINATING POWER SAVE OPERATIONS IN AN AD HOC NETWORK

FIELD OF THE PRESENT DISCLOSURE

This disclosure generally relates to wireless communication systems and more specifically to systems and methods for implementing a power save mechanism in an ad hoc network.

BACKGROUND

Wireless local area networks (WLANs) conforming to specifications in the Institute of Electrical and Electronics Engineers ("IEEE") 802.11 family typically involve an infrastructure-based network topology such as a basic service set (BSS) or an ad hoc-based network topology such as an independent basic service set (IBSS). While a BSS may be managed by a device acting in the role of an access point (AP), management functions in an IBSS are distributed among the participating devices. As a result of this structure, IBSS networks have the advantage of being very flexible and self-organizing while not depending on the presence of any given device in order to function.

One important area associated with network management is the provision of power management techniques that allow a device to enter a power save mode of operation, during which it may be able to conserve battery resources, but may not be able to receive or transmit communications. Implementing such techniques may be more challenging in an ad hoc network due to the lack of a dedicated management device, such as the AP.

Notably, an IBSS may be initiated by a wireless communications device, which for the purposes of this disclosure may be referred to as the IBSS creator. The next and any subsequent wireless communications devices that associate with the IBSS may likewise be referred to as IBSS joiners. In order to maintain synchronization within the IBSS and to maintain its ad hoc nature, all IBSS members share the responsibility of transmitting periodic beacons according to a scheduled defined during creation of the IBSS. These characteristics make it difficult for the participating wireless communications devices to remain in a power save mode of operation for extended periods. For example, it is expected for each IBSS member to transmit a beacon or receive beacons transmitted by the other members, resulting in each wireless communications device returning to active mode at the target beacon transmission time (TBTT) in order to transmit and/or receive beacons.

Accordingly, the techniques of this disclosure have been developed to increase the length of time a wireless communications device may operate in a power save mode while remaining associated with an IBSS WLAN. Consequently, wireless communications devices employing these techniques may improve their power efficiency while still receiving the benefits associated with an ad hoc network topology, such as flexibility and persistence. These and other aspects are the subject of the following descriptions.

SUMMARY

This specification discloses a method for wireless communications that may include operating a station in an independent basic service set (IBSS) for a plurality of stations by broadcasting a first beacon frame indicating an impending extended power save period by a power save initiator, wherein the power save initiator is a station within the IBSS, operating the power save initiator in a power save mode for the extended power save period and returning the power save initiator to an active mode after the extended power save period has elapsed.

In one aspect, the power save initiator may determine that other stations within the IBSS have extended power save capabilities by receiving a beacon frame having extended power save period information transmitted by each other station. Further, the power save initiator may broadcast the first beacon frame after receiving a beacon frame having extended power save period information from each other station.

In one aspect, the power save initiator may determine a trigger condition is met for entering an extended power save period and broadcast the first beacon based at least in part on the determination that the trigger condition is met. The trigger condition may be a period of inactivity.

In an embodiment, the first beacon frame may specify a duration of the extended power save period.

In one aspect, the power save initiator may broadcast at least one additional beacon frame by the power save initiator, such that each beacon frame provides relative timing information regarding a start time for the extended power save period. The timing information may be a decrementing count. Further, the power save initiator may operate in a power save mode after the decrementing count reaches a minimum value.

In one aspect, a first station within the IBSS may receive the first beacon frame and operate in a power save mode for the extended power save period.

This specification also discloses systems for wireless communications, such as a wireless communications device for use in an IBSS having a transceiver and a power save controller, wherein the transceiver may broadcast a first beacon frame indicating an impending extended power save period and the power save controller may operate the transceiver in a power save mode for the extended power save period and return the transceiver to an active mode after the extended power save period has elapsed.

In one aspect, the power save controller may determine that other stations within the IBSS have extended power save capabilities when the transceiver receives a beacon frame having extended power save period information transmitted by each other station. Further, the transceiver may broadcast the first beacon frame after the power save controller determines each other station has extended power save capabilities.

In one aspect, the power save controller may determine a trigger condition is met for entering an extended power save period and the transceiver may broadcast the first beacon based at least in part on the determination that the trigger condition is met. The trigger condition may be a period of inactivity.

In an embodiment, the first beacon frame may specify a duration of the extended power save period.

In one aspect, the transceiver may broadcast at least one additional beacon frame, such that each beacon frame provides relative timing information regarding a start time for the extended power save period. The timing information may be a decrementing count. Further, the power save controller may operate the transceiver in a power save mode after the decrementing count reaches a minimum value.

The systems of this disclosure may also include a wireless communications device for use in an IBSS with a plurality of stations having a transceiver and a power save controller, such that the transceiver may receive a first beacon frame indicating an impending extended power save period and the power save controller may operate the transceiver in a power save mode for the extended power save period and return the transceiver to an active mode after the extended power save period has elapsed.

BRIEF DESCRIPTION OF THE DRAWINGS

Further features and advantages will become apparent from the following and more particular description of the preferred embodiments of the disclosure, as illustrated in the accompanying drawings, and in which like referenced characters generally refer to the same parts or elements throughout the views, and in which.

DETAILED DESCRIPTION OF THE INVENTION

Figure 1:
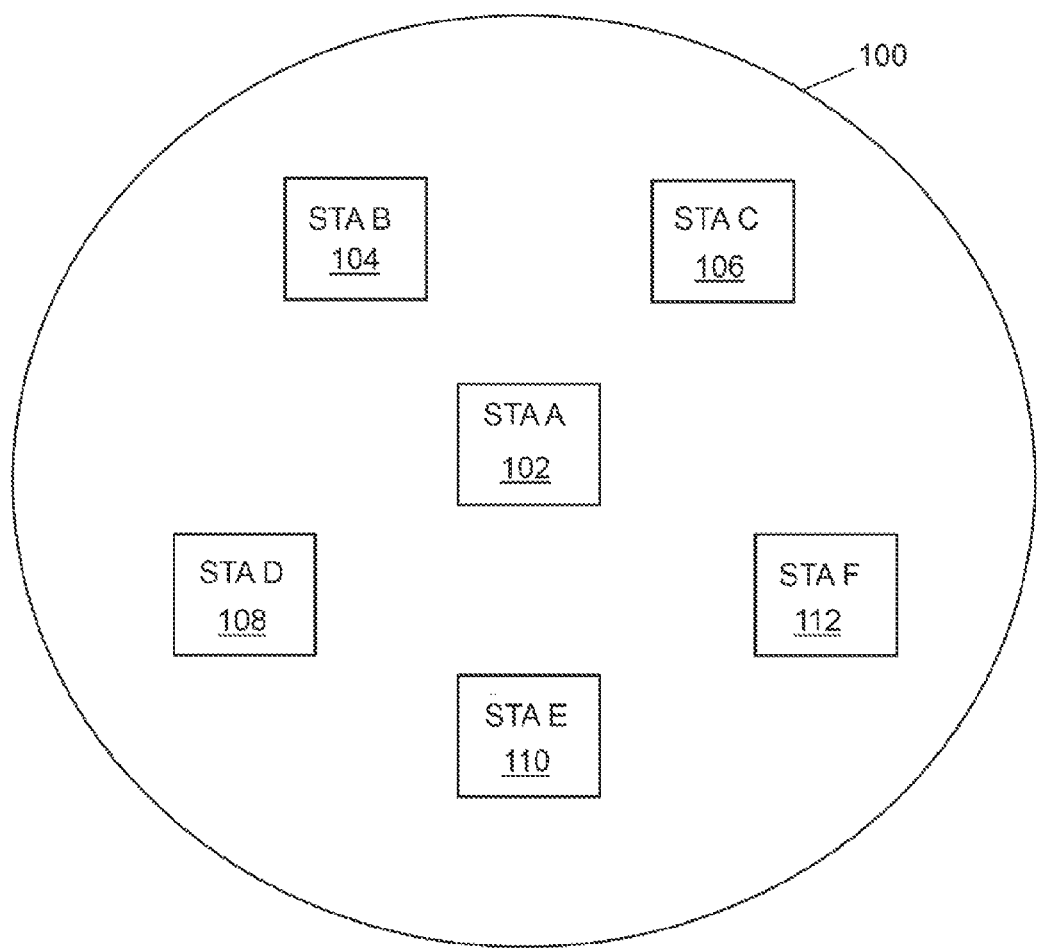
FIG. 1 schematically depicts a wireless system operating as an IBSS WLAN, according to one embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present invention and is not intended to represent the only exemplary embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For purposes of convenience and clarity only, directional terms, such as top, bottom, left, right, up, down, over, above, below, beneath, rear, back, and front, may be used with respect to the accompanying drawings or particular embodiments. These and similar directional terms should not be construed to limit the scope of the disclosure in any manner and may change depending upon context. Further, sequential terms such as first and second may be used to distinguish similar elements, but may be used in other orders or may change also depending upon context.

Embodiments are described herein with regard to a wireless communications device, which may include any suitable type of user equipment, such as a system, subscriber unit, subscriber station, mobile station, mobile wireless terminal, mobile device, node, device, remote station, remote terminal, terminal, wireless communication device, wireless communication apparatus, user agent, or other client devices. Further examples of a wireless communications device include mobile devices such as a cellular telephone, cordless telephone, Session Initiation Protocol (SIP) phone, smart phone, wireless local loop (WLL) station, personal digital assistant (PDA), laptop, handheld communication device, handheld computing device, satellite radio, wireless modem card and/or another processing device for communicating over a wireless system. Moreover, embodiments may also be described herein with regard to an access point (AP). An AP may be utilized for communicating with one or more wireless nodes and may be termed also be called and exhibit functionality associated with a base station, node, Node B, evolved NodeB (eNB) or other suitable network entity. An AP communicates over the air-interface with wireless terminals. The communication may take place through one or more sectors. The AP may act as a router between the wireless terminal and the rest of the access network, which may include an Internet Protocol (IP) network, by converting received air-interface frames to IP packets. The AP may also coordinate management of attributes for the air interface, and may also be the gateway between a wired network and the wireless network. A system for wireless communication may include one or more of such wireless communications devices.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

To help illustrate suitable systems and methods, an exemplary ad hoc WLAN 100 configured as an IBSS under 802.11 standards is depicted in FIG. 1. As shown. WLAN 100 may include a plurality of nodes, such as the wireless communications devices represented as stations (STAs) STA A 102, STA B 104, STA C 106, STA D 108, STA E 110 and STA F 112. Although shown with six nodes, suitable WLANs may include two or more wireless communications devices configured to implement the coordinated extended power save period techniques of this disclosure. Examples of devices that may be connected to either WLAN 100 include phones, Personal Digital Assistants (PDAs), computers of various types (laptops, personal computers, workstations, terminals of any type), global positioning system (GPS) devices, video devices such as cameras, camcorders, webcams, and virtually any other type of data device.

Power save mechanisms in a BSS WLAN typically utilize a periodic beacon transmitted by the AP to inform an associated STA in power save mode that data is pending delivery. Generally, the traffic indication map (TIM) information element (IE) in the beacons includes information regarding unicast traffic, allowing a STA to determine whether to poll the AP to initiate transfer of data that has been buffered. Delivery of group traffic, on the other hand, is not initiated by the stations. Rather, a subset of the beacons, known as delivery TIM (DTIM) beacons, are transmitted at a periodicity advertised by the AP and may be used to indicate that group traffic has been buffered and will be transmitted following the DTIM beacon. Conventional IBSS WLANs may employ a similar strategy through the use of announcement traffic indication messages (ATIMs) that are exchanged during a defined period of time known as the ATIM window that immediately follows the TBTT. All stations in the IBSS may awaken prior to the TBTT in order to receive the beacon transmission and stay awake at least for the duration of the ATIM window. Accordingly, an IBSS member may send an ATIM frame within the ATIM window to indicate the presence of buffered data that is pending transmission to one or more other members.

As noted, techniques of this disclosure facilitate coordination among member in an IBSS to allow members to remain in a power save mode of operation for extended periods of time without awakening to transmit or receive beacons at each scheduled TBTT. A new IE is defined herein as an "IBSS PS IE" that may be included in each beacon and used to establish a power save period during which all nodes in the network may enter a power save mode. Correspondingly, beacons may not be sent during the established power save period and any traffic to be exchanged between members of the IBSS WLAN may be buffered for delivery after the power save period ends. The power save period defined using the IBSS PS IE may be considered an extended period as wireless communications device 102 remains in power save mode for at least one TBTT at which it would otherwise return to active mode to receive and/or transmit a beacon under conventional power management techniques. The existence of the IBSS PS IE in the beacons may be used to establish the capabilities of the participating nodes to utilize the extended power save periods of this disclosure.

Figure 2:
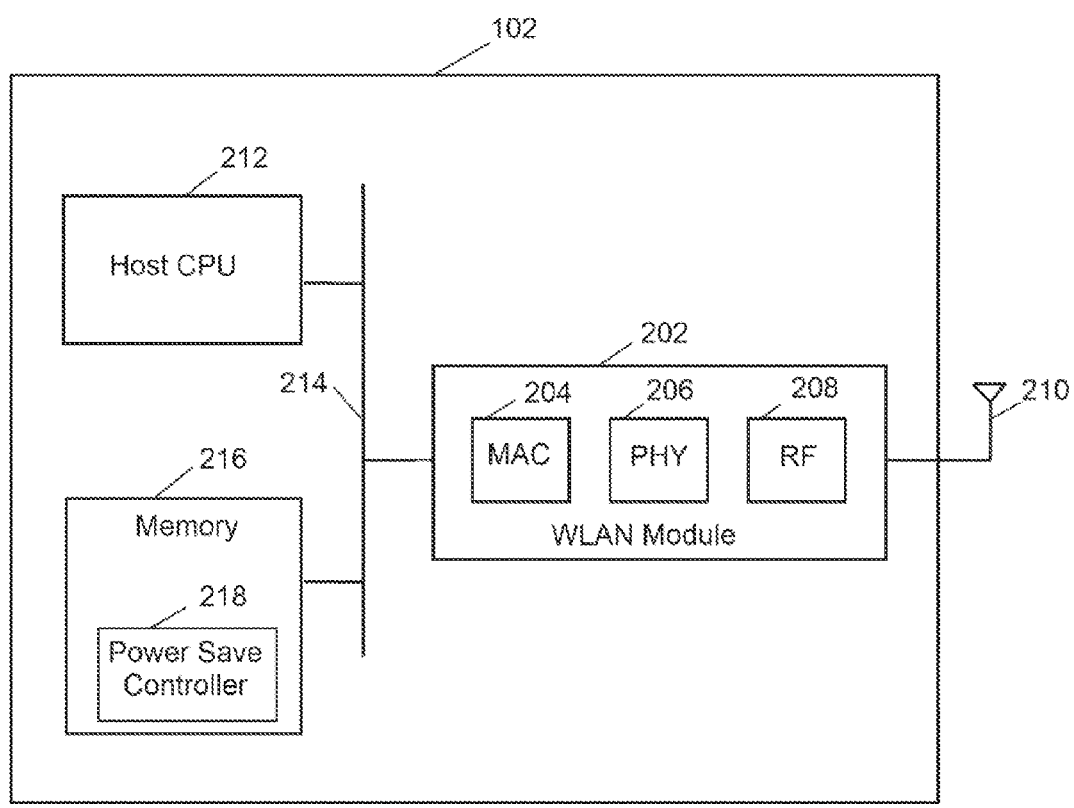
FIG. 2 schematically depicts functional blocks of a wireless communications device having extended power save period capabilities, according to one embodiment.

Details regarding one embodiment of a wireless communications device 102 having extended power save period capabilities are depicted as high level schematic blocks in FIG. 2. Generally, wireless communications device 102 may employ an architecture in which the lower levels of the WLAN protocol stack are implemented in firmware and hardware modules of WLAN transceiver 202. WLAN module 202 may include media access controller (MAC) 204 that performs functions related to the handling and processing of wireless frames of data (e.g., frames defined in various IEEE 802.11 protocols) including verification, acknowledgment, routing, formatting and the like. Incoming and outgoing frames are exchanged between the MAC 204 and a physical (PHY) layer 206 that modulates the frames. WLAN transceiver 202 may also include a radio frequency (RF) block 208 coupled to antenna 210 to provide the analog processing and RF conversion necessary to enable transmission and reception of wireless signals. Although not shown, RF block 208 may include conventional components such as one or more amplifying stages to amplify a received RF signal, one or more filtering stages to remove unwanted bands of frequencies, mixer stages to down-convert the received RF signal, automatic gain control (AGC) functionality to adjust the gain to an appropriate level for a range of received signal amplitude levels, an analog to digital converter (ADC) to convert the received RF signal into a digital signal, and the like. In the depicted embodiment, WLAN module 202 is shown with a single antenna and a single receive/transmit chain, but more antennas and/or more chains may be employed as desired, such as in a multiple input, multiple output (MIMO) system. Further, one or more antennas employed by WLAN module 202 may be shared with other wireless communications protocols.

Wireless communications device 102 may also include host CPU 212 configured to perform the various computations and operations involved with the functioning of wireless communications device 102. As shown, host CPU 212 is coupled to WLAN module 202 through bus 214, which may be implemented as a peripheral component interconnect express (PCIe) bus, a universal serial bus (USB), a universal asynchronous receiver/transmitter (UART) serial bus, a suitable advanced microcontroller bus architecture (AMBA) interface, a serial digital input output (SDIO) bus, or other equivalent interface. In one embodiment, upper layers of the protocol stacks of the WLAN and supplementary systems may be implemented as software instructions stored in memory 216 that may be accessed by host CPU 212 over bus 214.

Wireless communications device 102 may include power save controller 218 implemented as software instructions stored in memory 216 as depicted for the embodiment shown in FIG. 2. Power save controller 218 may be configured to transmit and receive messages using WLAN transceiver 202, such as in the form of an IBSS PS IE as described below, to coordinate establishment of an extended power save period thereby allowing wireless communications device 102 to operate in power save mode for the extended power save period. Further, power save controller 218 may operate WLAN transceiver 202 in active mode or in power save mode based at least in part on the extended power save period. In other embodiments, power save controller 218 may be implemented as a dedicated hardware circuit coupled to MAC 204 and PHY layer 206, or as any suitable combination of software, firmware and hardware.

Figure 3:
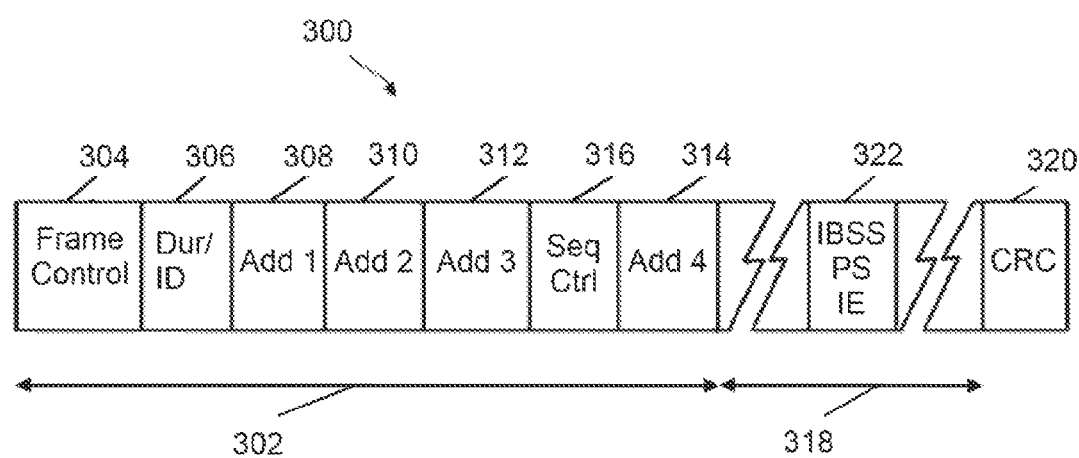
FIG. 3 schematically depicts the format of a beacon frame having extended power save period information, according to one embodiment.

According to the techniques of this disclosure, wireless communications device 102, or other devices having equivalent extended power save period capabilities, may coordinate the establishment of an extended power save period during which members of WLAN 100 may operate in a power save mode without transmitting or receiving beacons. As described above, one embodiment of this disclosure involves the use of an IBSS PS IE to establish the duration of an extended power save period and to coordinate the time at which the extended power save period begins. For example, a generalized beacon frame 300 having a format corresponding to IEEE 802.11 standards is depicted in FIG. 3. Frame 300 includes a MAC header 302, containing the frame control 304, duration/ID 306, address fields 308, 310, 312 and 314 and sequence control field 316. Frame 300 further includes a variable length frame body 318 and cyclic redundancy check (CRC) field 320. Frame control 304 segment of MAC header 302 includes fields providing various types of control information, including an identification of the 802.11 protocol of the frame, the type and subtype of the frame, distribution system information, information regarding additional information to be transmitted, security and order information. CRC field 320 may be employed to provide a frame check sequence (FCS) function.

Frame body 318 may be used to convey information and operational parameters regarding wireless communication system 100 and may include fields required by 802.11 standards as well as optional vendor-specific information elements. In an embodiment, frame body 318 may include extended power save period information in the form of IBSS PS IE 322. Under 802.11 specifications, frame body 318 may include a plurality of proprietary information elements that may be vendor-defined, any of which may be employed as IBSS PS IE 322. Notwithstanding, a new IBSS PS IE 322 may be defined and incorporated by IEEE into a suitable 802.11 protocol. In one embodiment, IBSS PS IE 322 includes an enabled field of one bit that may be set to indicate that power save mode has been initiated by wireless communications device 102. Further, IBSS PS IE 322 may include a timing field to designate when the extended power save period is to begin as well as a duration field to establish the length of the extended power save period. In one aspect, the timing field and/or duration fields may be expressed in terms of TBTT periods. Alternatively, either or both of the timing field and duration field may be expressed in any terms of absolute time using any suitable unit. In other embodiments, use of either or both of the timing field and duration field may be optional by employing predetermined values, such that receipt of an IBSS PS IE having the enabled bit set indicates that the extended power save period will begin after a fixed interval and/or the extended power save period has a fixed duration.

Figure 4:
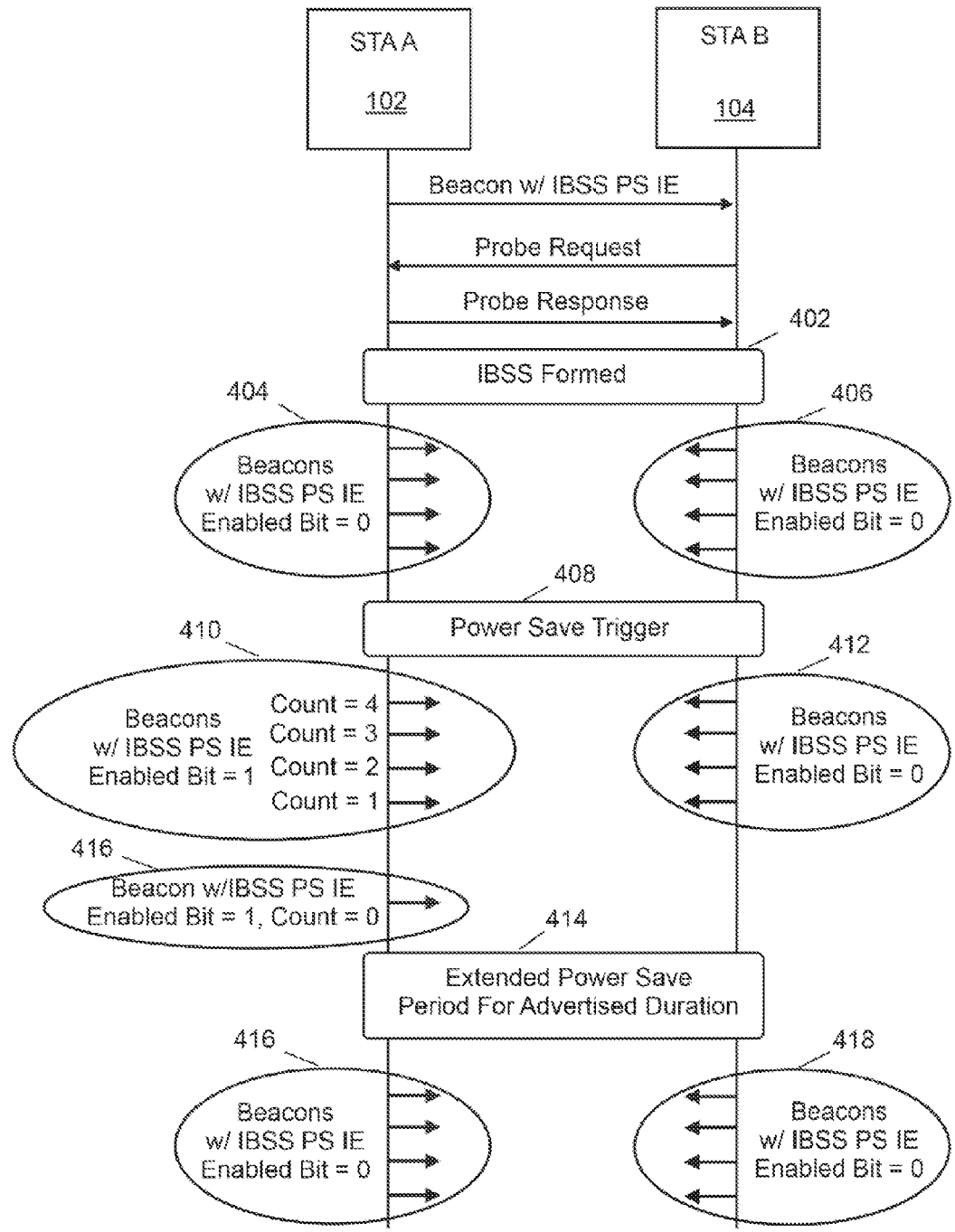
FIG. 4 schematically depicts a sequence diagram showing coordination of an extended power save period between stations in an IBSS, according to one embodiment.

An example of IBSS WLAN operation in the context of this disclosure is represented by the sequence diagram depicted in FIG. 4. In this embodiment, communications only involving STA A 102 and STA B 104 are shown, but any suitable number of nodes may operate in a manner similar to STA B 104 with respect to determining the start and duration of an extended power save period as established by STA A 102. As shown, STA A 102 may initiate the formation of an IBSS WLAN by broadcasting a beacon containing an IBSS PS IE. STA B 104 may receive the beacon and may join by sending a probe request and receiving a probe response in return. Thus, once at least two nodes have joined, including the initiator STA A 102, an IBSS WLAN is formed as indicated by 402. During normal operation periods including period 404 with respect to STA A 102 and period 406 with respect to STA B 104, all members of the IBSS may transmit beacons having IBSS PS IEs. Further, during normal operation, the enabled bit of the IBSS PS IE may be unset to indicate that the members are in active mode. During periods 404 and 406, data may be exchanged between members of the IBSS in a conventional manner.

During operation, a suitable trigger condition 408 may be met. In one aspect, this may be a period of inactivity, during which no data is being exchanged between members of the IBSS. As desired, other triggers, such as battery reserve or network conditions, may be employed. STA A 102 may indicate an impending extended power save period by transmitting a beacon having an IBSS PS IE with the enabled bit set. The IBSS PS IE may indicate the duration of the extended power save period using the duration field. Further, the timing field may be used to coordinate the start of the extended power save period among the members of the IBSS. In this embodiment, STA A 102 transmits sequential beacons during period 410 in which the timing field may be a decrementing count. By commencing with a count at a maximum count value of four in this embodiment, members of the IBSS receiving the beacons transmitted during period 410 have sufficient notice of the impending extended power save period to prepare for a graceful transition to a power save mode of operation, such as by flushing buffers and the like. As will be appreciated, any suitable value may be used as the maximum count value to either provide greater notice by using a larger value or by allowing for a more rapid entrance to power save mode by using a smaller value. STA B 104 may continue to transmit beacons during period 412 as described above with respect to period 406. Further, upon an indication of new activity or other change relative to the trigger condition, STA A 102 may interrupt the decrementing count and return to a period of normal operation by transmitting a beacon with an IBSS PS IE having the enabled bit unset.

Accordingly, an extended power save period 414 may be initiated when STA A 102 transmits a beacon with an IBSS PS IE having the enabled bit set and the timing field with a count of zero as indicated by 416. Upon receipt of this beacon, each member of the IBSS may be aware that STA A 102 is now in a power save mode of operation. Likewise, each member may also be in a power save mode of operation for the duration of the extended power save period. After the extended power save period has elapsed, STA A 102, STA B 104 and any other members of the IBSS may return to active operation and begin transmitting beacons with an IBSS PS IE having the enabled bit unset as indicated by periods 416 and 418, respectively. In this manner, the IBSS members may confirm synchronization or resynchronize and otherwise maintain association.

One device in the network may be granted authority to initiate the power save period, such as STA A 102 in the discussion above. In one aspect, this may be granted to the eldest node in the network, such as the IBSS creator. If the IBSS creator leaves the network, the authority may pass to the eldest IBSS joiner. Other suitable mechanisms for granting authority may be used as desired, such as a comparison of MAC addresses, relative capabilities of the nodes, or the like. As noted, the power save initiator may establish an impending extended power save period based at least in part on the occurrence of any suitable trigger. For example, a threshold period of inactivity may be defined so that if no data exchanges have taken place within the threshold period, the IBSS initiator may commence sending beacons with IBSS PS IEs having the enabled bit set and a suitable timing field, such as the decrementing count described above.

Figure 5:
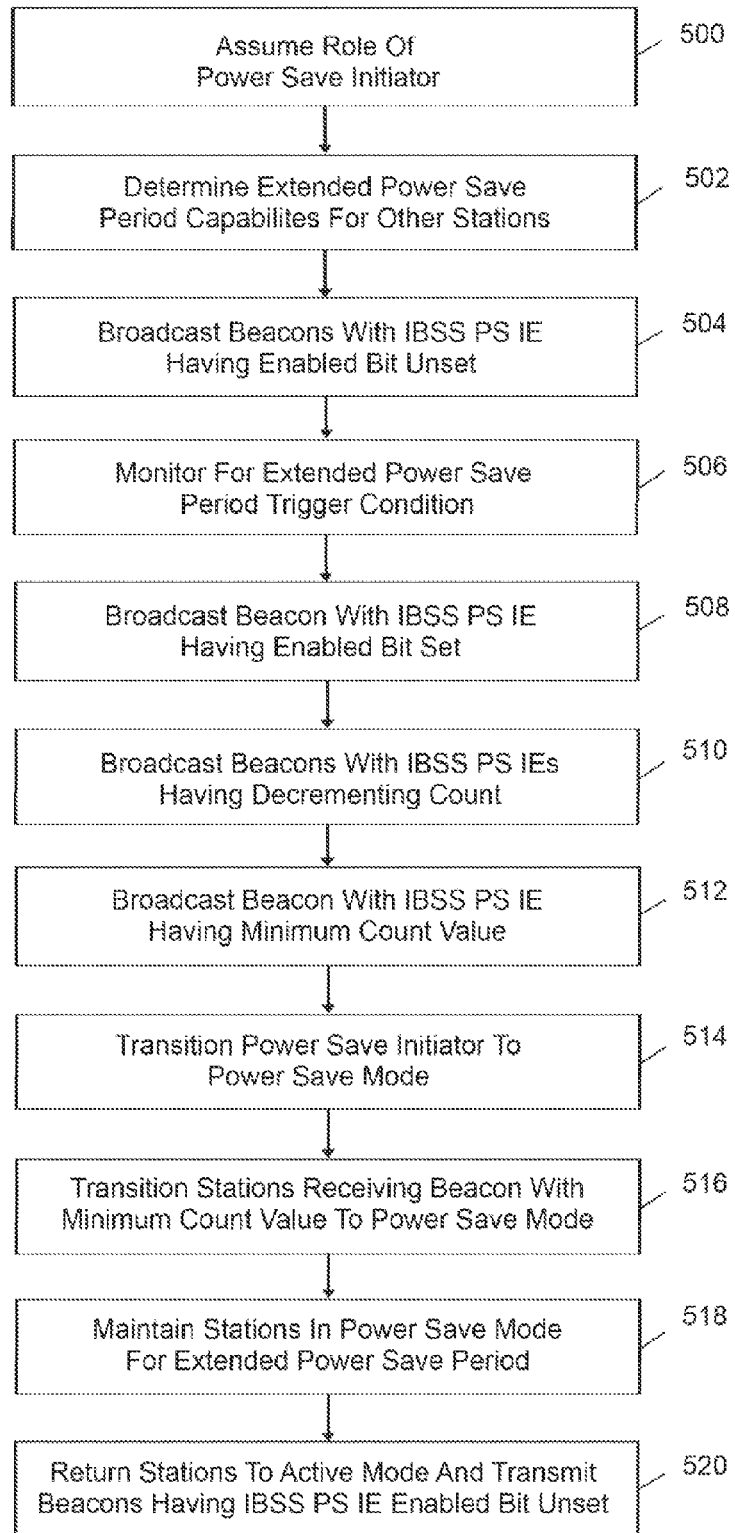
FIG. 5 is a flow chart showing a routine for coordinating an extended power save period between stations in an IBSS, according to one embodiment.

To help illustrate aspects of the disclosure, the flowchart depicted in FIG. 5 represents one embodiment in the context of STA A 102 and STA B 104. A suitable routine may begin in 500 with STA A 102 assuming the role of power save initiator, which as described above, may be predicated on any suitable criteria, such as being the IBSS creator or, if the IBSS creator has left the WLAN, the eldest member. Next, in 502, STA A 102 may determine whether STA B 104 and any other current members of the WLAN have appropriate extended power save capabilities. In order to maintain compatibility with legacy stations, the extended power save techniques of this disclosure may be employed upon a determination that each member has the appropriate capabilities. Power save controller 218 may check for the presence of an IBSS PS IE in the beacons transmitted by members to make the capability determination.

During normal operation as indicated in 504, STA A 102, STA B 104 and any other members may transmit beacons having an IBSS PS IE with the enabled bit unset. In its role as power save initiator, STA A 102 monitors for occurrence of an extended power save period trigger in 506, such as a period of WLAN inactivity as discussed above. When the trigger condition is met, power save controller 218 of STA A 102 may communicate an impending extended power save period to STA B 104 and other members by transmitting a beacon having an IBSS PS IE with the enabled bit set in 508. As desired, the IBSS PS IE may also include timing and/or duration information. Thus, in this embodiment, STA A 102 broadcasts a sequence of beacons having IBSS PS IEs with a decrementing count as represented by 510.

Correspondingly, STA A 102 may transmit a terminal beacon with an IBSS PS IE with the enabled bit set and a count having the minimum value in 512 upon which power save controller 218 transitions WLAN transceiver 202 to a power save mode in 514. Similarly, STA B 104 and any other member receives the terminal beacon broadcast by STA A 102 and also transition to a power save mode of operation in 516. STA A 102, STA B 104 and any other members remain in power save mode for the duration of the extended power save period in 518 and then return to active mode in 520 to commence transmitting beacons having an IBSS PS IE with the enabled bit unset to indicate being in active mode and to restore synchronization and maintain association of the WLAN. The routine may repeat as desired, with another member assuming the role of power save initiator as necessary if STA A 102 leaves the network.

Described herein are presently preferred embodiments. However, one skilled in the art that pertains to the present invention will understand that the principles of this disclosure can be extended easily with appropriate modifications to other applications.

What is claimed is:

1. A method for operating an independent basic service set (IBSS) for a plurality of stations, the method being performed by a power save initiator within the IBSS and comprising:
determining scheduled target beacon transmission times (TBTTs) at which one or more of the plurality of stations are scheduled to transmit beacons;
detecting a trigger condition for entering an extended power save period, wherein a duration of the extended power save period is greater than a TBTT period;
upon detecting the trigger condition, signaling the extended power save period to the plurality of stations to prevent the stations from transmitting beacons during one or more of the scheduled TBTTs;
operating in a power save mode for the extended power save period, wherein the extended power save period causes the power save initiator to remain in the power save mode during the one or more scheduled TBTTs; and
returning to an active mode after the extended power save period has elapsed.

2. The method of claim 1, further comprising determining that other stations within the IBSS have extended power save capabilities by receiving a beacon frame having extended power save period information from the other stations.

3. The method of claim 2, wherein the power save initiator is to signal the extended power save period after receiving a beacon frame having extended power save period information from each of the plurality of stations.

4. The method of claim 1, wherein the signaling comprises:
broadcasting a first beacon frame upon determining that the trigger condition is met, wherein the first beacon frame includes an information element (IE) indicating the extended power save period.

5. The method of claim 4, wherein the trigger condition corresponds to a period of inactivity.

6. The method of claim 4, wherein the first beacon frame specifies the duration of the extended power save period.

7. The method of claim 4, further comprising broadcasting at least one additional beacon frame, wherein each beacon frame provides relative timing information regarding a start time for the extended power save period.

8. The method of claim 7, wherein the timing information comprises a decrementing count.

9. The method of claim 8, wherein the power save initiator is operated in a power save mode after the decrementing count reaches a minimum value.

10. The method of claim 4, wherein the first beacon frame causes each of the plurality of stations within the IBSS to operate in the power save mode for the duration of the extended power save period.

11. A wireless communications device comprising a transceiver and a power save controller, the wireless communications device being configured to:
determine scheduled target beacon transmission times (TBTTs) at which one or more of a plurality of stations of an independent basic service set (IBSS) are scheduled to transmit beacons;
detect a trigger condition for entering an extended power save period, wherein a duration of the extended power saving period is greater than a TBTT period;
upon detecting the trigger condition, signal the extended power save period to the plurality of stations to prevent the stations from transmitting beacons during one or more of the scheduled TBTTs;
operate in a power save mode for the extended power save period, wherein the extended power save period causes the wireless communications device to remain in the power save mode during the one or more scheduled TBTTs; and
return to an active mode after the extended power save period has elapsed.

12. The wireless communications device of claim 11, wherein the power save controller is to further determine that others of the plurality of stations within the IBSS have extended power save capabilities if the transceiver receives a beacon frame having extended power save period information from the other stations.

13. The wireless communications device of claim 12, wherein the transceiver is to signal the extended power save period after the power save controller determines that each of the plurality of stations has extended power save capabilities.

14. The wireless communications device of claim 11, wherein the wireless communications device is to signal the extended power save period by:
broadcasting a first beacon frame upon determining that the trigger condition is met, wherein the first beacon frame includes an information element (IE) indicating the extended power save period.

15. The wireless communications device of claim 14, wherein the trigger condition corresponds to a period of inactivity.

16. The wireless communications device of claim 14, wherein the first beacon frame specifies the duration of the extended power save period.

17. The wireless communications device of claim 14, wherein the transceiver is to further broadcast at least one additional beacon frame, wherein each beacon frame provides relative timing information regarding a start time for the extended power save period.

18. The wireless communications device of claim 17, wherein the timing information comprises a decrementing count.

19. The wireless communications device of claim 18, wherein the power save controller is to operate the transceiver in a power save mode after the decrementing count reaches a minimum value.

20. A non-transitory computer-readable medium storing instructions that, when executed by one or more processors of a wireless communications device, cause the wireless communications device to:
determine scheduled target beacon transmission times (TBTTs) at which one or more of a plurality of stations of an independent basic service set (IBSS) are scheduled to transmit beacons;
detect a trigger condition for entering an extended power save period, wherein a duration of the extended power save period is greater than a TBTT period;
upon detecting the trigger condition, signal the extended power save period to the plurality of stations to prevent the stations from transmitting beacons during one or more of the scheduled TBTTs;
operate in a power save mode for the extended power save period, wherein the extended power save period causes the wireless communications device to remain in the power save mode during the one or more scheduled TBTTs; and
return to an active mode after the extended power save period has elapsed.

* * * * *